United States Patent Office 3,519,577
Patented July 7, 1970

3,519,577
METHOD FOR FORMING ELASTOMERIC PARTICLES
Leonard L. Olson, St. Paul Park, Minn., assignor to Minnesota Mining and Manufacturing Company, St. Paul, Minn., a corporation of Delaware
No Drawing. Filed June 22, 1964, Ser. No. 377,048
Int. Cl. C08g 22/44, 53/08; C08d 13/10
U.S. Cl. 260—2.5                    10 Claims

ABSTRACT OF THE DISCLOSURE

A method is taught for forming ground particles of organic polymeric material, capable of passing a screen of 100 mesh, each particle being essentially uniformly permeated with a random network of capillary-type micro-passages within which a volatile liquid is essentially uniformly distributed. The method involves polymerization of precursor ingredients in a volatile liquid in which the precursor ingredients are soluble, and then grinding the polymerizate while the volatile liquid is still present. The mass so ground is extremely crumbly and friable.

---

This invention relates to a new method for preparing small particles of organic polymeric material, to the particles so prepared, and to masses of the particles in admixture with coatable liquid materials.

The grinding of organic polymeric materials to reduce them in size has been conventional heretofore; and in the case of those materials which are rather brittle in character, grinding has been a reasonably satisfactory method by which to conduct size reduction to produce finely-divided particulate material. Grinding, however, has not been an entirely satisfactory method for reducing the size of elastomeric materials. Even when elastomeric materials are frozen, as by immersing them in liquid carbon dioxide or the like prior to grinding, size reduction of them has been a problem and has been time consuming.

This invention provides a new method by which organic polymeric materials may conveniently be reduced in size without need to resort to a preliminary freezing step. The method is particularly effective as a means to accomplish size reduction of elastomeric materials. By practice of the invention, large masses of polymeric material, including elastomeric materials, may be reduced in size by grinding, in a relatively rapid and convenient manner, even to the extent of forming resultant masses of particles capable of passing a screen 100 mesh or smaller. Of course, larger particle sizes (such as those passing screens of 50 mesh) may also be prepared by practice of the method hereof; but the greatest advantages of the method are realized when the objective is to obtain a mass of particles with at least about 80% or 90% or even 100% of the weight thereof accounted for by particles passing a screen of 100 mesh (150 microns) or even 200 mesh (75 microns) or smaller. Particles as small as 3-5 microns may be formed according to the teachings hereof.

The particles obtained by practice of this invention are useful in a variety of applications where particles have heretofore been used. In the dried state, these particles may be fluidized for coating purposes. Particles of the invention are useful as additions to paintable compositions to impart novel properties to dried paint films.

It is noteworthy that the particles obtained by practice of this invention are not the same as those characteristically obtained by using the grinding techniques heretofore employed. The solid material of the particles hereof is permeated with a random distribution of capillary-type micro-passages or micropores. A significant quantity of volatile liquid material is contained within the micro-passages of freshly ground material, usually sufficient to account for at least about one-fourth of the dry (i.e., volatile-liquid-free) weight of the particles. Such a large quantity of volatile liquid in polymer particles is considered highly unusual. Volatile liquid may rapidly be removed from the particles by heating to a temperature at which volatilization of the liquid occurs; and the dried particles are capable of rapidly re-adsorbing the liquid within their capillary micro-passages within minutes (or even seconds) upon re-exposure of the dried particles to the volatile liquid. Even organic polymeric materials conventionally considered to be relatively hard and tough are, when examined immediately after formation by the process taught herein (i.e., polymerization of dissolved ingredients in volatile liquid), crumbly and more yieldable or less brittle as compared to particles of the same material examined after formation by techniques in the prior art (i.e., polymerization of precursor ingredients not directly from a dissolved state in a volatile liquid).

A very noteworthy characteristic of particles formed according to the teachings herein is their high strength and high toughness when dried free of volatile liquid, and conversely, their crumbly character within minutes after exposure to volatile liquid (which is adsorbed within their micro-passages).

In a very real sense, the principle of size reduction relied upon in practicing the method of this invention is quite contrary to the principle of size reduction relied upon in the practice of grinding as heretofore accomplished. Those skilled in the art have heretofore considered hardness or brittleness of a mass of material to be a key factor in accomplishing effective size reduction by grinding, whereas the teaching of this invention relies upon imparting of a soft-crumbly character to a mass of organic material in order to accomplish effective size reduction.

Indeed, the first step for size reduction according to the present teaching is that of imparting a crumbly, punky or cheesy character to the organic material to be reduced in size. This is conveniently done by forming the polymeric material by polymerization of organic-polymer precursor ingredients (i.e., ingredients which on chemical reaction or polymerization provide an insoluble polymeric material) directly from a dissolved state for the precursor ingredients in a volatile liquid chemically inert to the precursor ingredients. Of importance is the fact that the precursor ingredients are maintained in solution until polymerization proceeds sufficiently to convert them into an organic polymer insoluble in the volatile liquid. The solution of precursor ingredients is so constituted that at least 35% of its total weight (i.e., the total of precursor ingredients and volatile liquid in which they are dissolved) is accounted for by precursor ingredients, and at least 20% of its total weight is accounted for by volatile liquid. If pigment particles or other inert filler materials are desired as part of the final polymeric particles to be formed, an amount of pigment or other filler material may be dispersed in the solution up to an amount approximately equal to the weight of precursor ingredients dissolved in the volatile liquid.

Polymerization of the precursor ingredients to provide a resulting polymer (whether a homopolymer or heteropolymer; whether a condensation reaction or addition reaction) is promoted by subjecting the solution of precursor ingredients to conditions favorable to effect the necessary chemical interaction between the precursor ingredients to gain a resulting polymer insoluble in the volatile liquid in which the precursor ingredients are originally dissolved. Where mixtures of interreactive precursor ingredients are employed, it is not necessary to maintain a stoichiometric relationship between the ingredients of the mixture; it is only necessary that the mixture be such as to convert by chemical interaction or polymerization to a solid state insoluble in the volatile liquid. The polymerization step itself may be referred to as a curing step, particularly in the case of forming elastomers. The precursor ingredients preferably employed for practice of the invention are, usually at least in part, bulky molecules appropriately considered pre-polymers as distinguished from monomers; and curing of these pre-polymers in admixture with reactive material to form complex heteropolymers constitutes preferred practice according to the invention. However, the teaching of the invention is quite suitable to employ in forming homopolymers, with monomers (and catalysts for polymerization of the same) as the starting constituents dissolved in volatile liquid.

Polymerization or curing is most conveniently accomplished by placing the solution containing dissolved precursor ingredients within a sealed container essentially free of any significant void or space above the solution and then elevating the temperature of the dissolved precursor ingredients to that for practical speed of curing or polymerization. By maintaining the solution in a sealed container essentially free of a void or space, solvent volatilization and escape under the elevated temperature conditions required for rapid curing is obviated. (But lower temperature curing may, if desired, be accomplished without placing the ingredients in a sealed container.) Polymerization or curing may be continued until the precursor ingredients are substantially completely cured, or may be terminated at any point after the precursor ingredients are converted into a room-temperature-solid state insoluble in the volatile liquid material present in the mass. During preliminary stages of polymerization, until the precursor ingredients are converted to a gell state, it has been found desirable to slightly agitate the contents of the container, when dispersed pigment or other inert filler is present in the mixture, so as to reduce or obviate any significant phase separation between the dispersed constituents and the polymer precursor ingredients within which the dispersed ingredients are to be entrapped in a dispersed state upon completion of polymerization.

The material resulting from the polymerization step is then subjected to grinding action to crumble it and thereby gain size reduction. Suitably this is accomplished by first cutting the mass into strips or chunks, then grinding it in a conventional meat grinder to reduce the size of the particles to about ¼ inch or less, and then further grinding the material with positive shearing action—as by passing it as many times as desired (2 or 3 times being sufficient) through a milling machine such as a 3-roll paint mill (with opposed rolls operating at different speeds to give positive shearing action)—to gain still further size reduction. Particles formed as a result of 2 or 3 passes through the mill with positive shearing action may vary in size, usually from approximately 3 or 5 microns or so up to 100 or 150 microns in size. At this stage, the particles may appear to be slightly agglomerated, but they are discrete and of greatly reduced size as noted (even though some "cobweb" type connections between particles may be present), and may further be reduced in size, or given an apparent further reduction in size (or separation as by tearing), by subjecting the mass, in liquid dispersion, to further positive shearing action in a stone mill (e.g., a Moorehouse mill).

Not only are the particles so formed very small in size, but they contain a significant quantity of volatile liquid material. The aforenoted size-reduction operations are conducted within a relatively short time such that evaporation of volatile liquid from the particles is not of greatly significant magnitude. Usually at least approximately 20% of the total weight of the particles up to approximately 65% of their weight is accounted for by volatile liquid. Stated another way, at least about one-fourth of the dry weight of the particles is accounted for by volatile liquid at this stage. Preferably this volatile liquid is maintained in the particles where the particles are to be dispersed in a paint vehicle or the like. Thus, the particles are preferably placed in a sealed container (such as an envelope of polyethylene) when they are to be stored and later employed as a dispersed phase in a liquid composition such as paint. However, the volatile liquid in the particles may, as aforenoted, be rapidly removed from them by heating them to volatilization temperatures for the liquid. Also, extended times in the atmosphere will cause gradual reduction of volatiles, if that is desired.

The following examples are illustrative.

EXAMPLE 1

This example illustrates the formation of non-pigmented polyurethane elastomeric particles; but it should be appreciated that the composition of the particles may be augmented by pigment additions (e.g., preferably finely-divided pigment particles of conventional size below about 2 microns).

| Ingredients: | Parts by wt. |
| --- | --- |
| Hydroxyl-terminated polyester ("Multron R18") | 30.4 |
| Hydroxyl-terminated polyester ("Multron R12") | 7.6 |
| Isocyanate compound ("Mondur CB75") | 22.0 |
| Ethylene glycol mono-ethyl ether (Cellosolve acetate) acetate (volatile liquid) | 20.0 |
| Xylol (volatile liquid) | 20.0 |

"Multron R18" is a slightly branched hydroxyl-terminated polyadipate polyester having a hydroxyl number of about 57–63 and an acid number of 1.5 maximum. "Multron R12" is a moderately branched hydroxyl-terminated polyadipate polyester having a hydroxyl number of 158–175 and an acid number of 4.0 maximum. "Mondur CB75" is an ethyl-acetate solution containing about 75% by weight of a polyisocyanate prepolymer formed by reacting toluene diisocyanate and a trifunctional polyol such as trimethylol propane. It has an isocyanate content of about 13% and an isocyanate equivalent weight of about 323.

The first three ingredients of the formula are dissolved in the volatile liquids by stirring and the resultant solution placed in a sealed container in which the curing reaction between the hydroxyl-terminated polyesters and isocyanate compound proceeds either at room temperature (for approximately one week) or at elevated temperatures (such as 130° F. for approximately 72 hours).

(When pigment additions are also dispersed in the solution, the mixture in the sealed container is agitated, suitably by stirring the mixture or moving the container or shaking it so as to maintain essentially uniform distribution of all the ingredients until initial gelling of the elastomeric precursor components takes place.)

The resulting cured product is a rubbery gell but is very crumbly and friable. It is suitably ground with high shearing action by passing it through a three roll paint mill until the desired particle size is obtained. Additional volatile liquid such as xylol may be added during milling to reduce tackiness, if desired. Elastomeric particles capable of passing a screen of 100 mesh or smaller are conveniently prepared by this technique. Particles having the formula of this example contain approximately 45.5% by weight volatile liquid material.

EXAMPLE 2

In the solution of Example 1 is dispersed about 10 parts by weight of TiO$_2$ pigment by milling. The total mixture is heated to approximately 200° F. for 1 or 2 hours with stirring until gelling begins to occur. Then the mixture is placed in a sealed container and heated at 130° F. for about 16 hours to accomplish curing. Size reduction is accomplished on a three roll paint mill to provide a mass of particles ranging from about 10 to 150 microns in size. Volatile liquid content of the particles is about 41% by weight.

EXAMPLE 3

| Ingredients: | Parts by wt. |
|---|---|
| Isocyanate compound ("Adiprene L100") | 38.5 |
| Curing reactant ("Moca") | 4.2 |
| Xylol (volatile liquid) | 57.3 |

"Adiprene L100" is the reaction product of diisocyanate and a polyalkylene ether glycol (oxytetramethylene glycol). It has an isocyanate content of 4.1% by weight. "Moca" is 4,4'-methylene bis orthochloroaniline. The first two precursor ingredients are dissolved in the xylol, and the solution heated to 130° F. for 24 hours to accomplish curing. Thereafter size reduction of the cheesy resultant mass by high shear milling action is accomplished to produce particles of desired size range, particularly those within the range of 10 to 150 microns, preferably 10 to 100 microns. Volatile liquid accounts for about 57% by weight of the particles.

EXAMPLE 4

| Ingredients: | Parts by wt. |
|---|---|
| Polyamide (Versamid 100") | 21 |
| Epoxy resin ("Epon 834") | 19 |
| Xylol (volatile liquid) | 30 |
| Cellosolve acetate (volatile liquid) | 30 |

"Versamid 100" is a polyamide resin prepared by the action of a dimeric fatty acid with a polyamine. It has an amine number of 83–93. "Epon 834" is an epoxy resin condensation product formed by reacting epichlorhydrin and bisphenol A. It has an epoxy equivalent of approximately 230–280. The polyamide and epoxy resin are dissolved in the volatile liquids, and the resultant solution placed in a sealed container. Curing of the polyamide and epoxy resin mixture is accomplished at 130° F. for 48 hours. While the solids cured composition is resinous in character, it assumes a cheesy or punky state as it exists as a cured mass with the volatile liquids present therein. It is conveniently reduced in size by high shear milling to produce particles below 150 microns, with a volatile liquid content of about 60% by weight.

EXAMPLE 5

A mill base is formed by mixing the following ingredients in a pebble mill for approximately 16 to 24 hours or until the ingredients are intimately dispersed and blended together.

| Ingredients: | Parts by wt. |
|---|---|
| Rutile $TiO_2$ pigment | 5.5 |
| Molybdate orange pigment | .17 |
| Quinacridone violet pigment | .01 |
| Light chrome yellow pigment | .10 |
| Carbon black pigment | .01 |
| "Bentone 38" (an alkyl magnesium montmorillonite) | .03 |
| Hydroxyl-terminated polyester ("Multron R18," as described in Example 1) | 1.45 |
| Xylol (volatile liquid) | 3.62 |
| Cellosolve acetate (volatile liquid) | 3.62 |

The above mill base is then added to a mixture of the following ingredients and the total mass then mixed until uniformly blended together in a high shear mixer. This takes approximately one hour.

| Ingredients: | Parts by wt. |
|---|---|
| Hydroxy-terminated polyester ("Multron R18") | 25.75 |
| Hydroxyl-terminated polyester ("Multron R12," as described in Example 1) | 6.8 |
| Xylol (volatile liquid) | 14.96 |
| Cellosolve acetate (volatile liquid) | 16.58 |
| Isocyanate compound ("Mondur CB75," as described in Example 1) | 21.4 |

The resulting blend is then placed in a sealed container such as a paint can and cured in an oven at 130° F. for approximately 72 hours. Until the mixture in the container gels, it is occasionally mixed as by rolling or shifting the container in order to maintain dispersion of the pigment. The resulting cheesy and crumbly material is then reduced in size by paint milling to provide a mass of particles ranging from about 10 and 150 microns, with volatile liquid accounting for about 44% by weight of the particles and the pigment content accounting for about 5.8% of the weight of the particles.

That which is claimed is:

1. A method for conveniently making a quantity of separate discrete particles of organic elastomeric material comprising (1) dissolving in a volatile liquid a mixture of organic precursor ingredients that are polymerizable in the liquid to a solid elastomeric material, the volatile liquid accounting for at least 20 weight-percent, and the precursor ingredients at least 35 weight-percent, of the solution, and the volatile liquid being (a) a solvent for the precursor ingredients and (b) a non-solvent for the elastomeric material, but capable of being retained in and swelling the elastomeric material; (2) subjecting said solution to conditions favorable to polymerization of said precursor ingredients while maintaining said precursor ingredients in solution in said volatile liquid until said polymerization proceeds sufficiently to convert said precursor ingredients into a solid mass of said elastomeric material, said mass being essentially uniformly permeated with a random network of capillary-type micropassages within which said volatile liquid is essentially uniformly distributed such that the total mass is relatively exceedingly crumbly as compared to an otherwise identical organic elastomeric material formed by polymerization of precursor ingredients not dissolved in a volatile liquid; and (3) grinding said mass into particles of reduced size while the volatile liquid content thereof accounts for at least about 20 weight-percent of said mass.

2. A method of claim 1 in which polymerization is performed while the solution is in a sealed container.

3. The method of claim 1 in which the organic precursor ingredients are polyurethane precursor ingredients.

4. The method of claim 1 in which the solution of precursor ingredients dissolved in volatile liquid contains particles of pigment dispersed therein in an approximate quantity by weight no greater than the quantity by weight of said dissolved precursor ingredients, and in which the conditions favorable to polymerization of the precursor ingredients are maintained while simultaneously maintaining the pigment particles dispersed essentially uniformly throughout the solution of precursor ingredients in the volatile liquid.

5. A method of claim 1 in which the precursor ingredients are polymerizable to a crosslinked elastomeric material, and the solution is subjected to conditions that convert the precursor ingredients to a crosslinked mass.

6. A quantity of discrete organic elastomeric particles between 3 and 150 microns in diameter prepared by the process of claim 1 and having the network of micropassages in the particles filled with a volatile liquid.

7. A quantity of discrete organic elastomeric particles between 3 and 150 microns in diameter prepared by the process of claim 1 and having the volatile liquid evaporated from the random network of micropassages so that the micropassages are collapsed.

8. A coatable composition comprising a liquid film-forming vehicle and discrete elastomeric particles between 3 and 150 microns in diameter prepared by the process of claim 1.

9. A quantity of discrete elastomeric polyurethane particles between 3 and 150 microns in diameter prepared by the process of claim 3.

10. A quantity of discrete pigmented elastomeric particles between 3 and 150 microns in diameter prepared by the process of claim 4.

References Cited
UNITED STATES PATENTS
| | | | |
|---|---|---|---|
| 3,256,219 | 6/1966 | Will | 260—2.5 |
| 3,427,277 | 2/1969 | Davis. | |
| 2,675,370 | 4/1954 | Barrett. | |
| 2,681,321 | 6/1954 | Stastny et al. | 260—2.5 |
| 2,744,291 | 5/1956 | Stastny et al. | 260—2.5 |
| 2,848,428 | 8/1958 | Rubens | 260—2.5 |
| 2,878,194 | 3/1959 | Rubens | 260—2.5 |

FOREIGN PATENTS
111,265  12/1961  Pakistan.

SAMUEL H. BLECH, Primary Examiner

W. J. BRIGGS, Sr., Assistant Examiner

U.S. Cl. X.R.

260—31.2, 33.2, 33.4, 37, 75, 77.5